United States Patent
Sumiyoshi et al.

[11] 3,798,596
[45] Mar. 19, 1974

[54] CENTRALIZED WARNING SYSTEM FOR VEHICLES

[75] Inventors: Masaharu Sumiyoshi; Hiroshi Arai, both of Toyota; Hisato Wakamatsu; Nobumasa Higo, both of Kariya, all of Japan

[73] Assignees: Nippondensco Co., Ltd., Aichi-ken; Toyota Jidosha Kogyo Kabushiki Kaisha, Toyota-shi, both of, Japan

[22] Filed: Oct. 26, 1971

[21] Appl. No.: 192,421

[30] Foreign Application Priority Data
Oct. 27, 1970 Japan.............................. 45-94544

[52] U.S. Cl................. 340/52 F, 340/324, 340/414
[51] Int. Cl................................................ B60q 1/00
[58] Field of Search ........ 340/52 R, 52 F, 412, 413, 340/414, 415

[56] References Cited
UNITED STATES PATENTS
| | | | |
|---|---|---|---|
| 1,481,471 | 1/1924 | LaLonde........................... | 340/52 F |
| 2,571,360 | 10/1957 | Hallerberg........................ | 340/52 F |
| 3,202,804 | 8/1965 | Schlein ............................ | 340/412 X |
| 3,401,373 | 9/1968 | Risner............................... | 340/52 R |
| 3,541,550 | 11/1970 | Hamre .............................. | 340/413 |
| 3,431,779 | 3/1969 | Wilken et al...................... | 340/52 R |
| 3,626,367 | 12/1971 | Howard et al..................... | 340/52 F |

Primary Examiner—John W. Caldwell
Assistant Examiner—Kenneth N. Leimer
Attorney, Agent, or Firm—Cushman, Darby and Cushman

[57] ABSTRACT

A centralized warning system for vehicle is provided wherein "1" and "0" signals are received from a plurality of sensors mounted at various parts of a vehicle where checking is required, whereby according to preliminary classified conditions of danger for driving of the vehicle "Normal", "Warning" or "Danger" is identified by the "1" and "0" signals to thereby indicate the condition of danger of the defective part. Furthermore, when two or more abnormality signals are simultaneously generated by said plurality of sensors, the location of most dangerous defective part is indicated according to the predetermined orders of priority.

11 Claims, 8 Drawing Figures

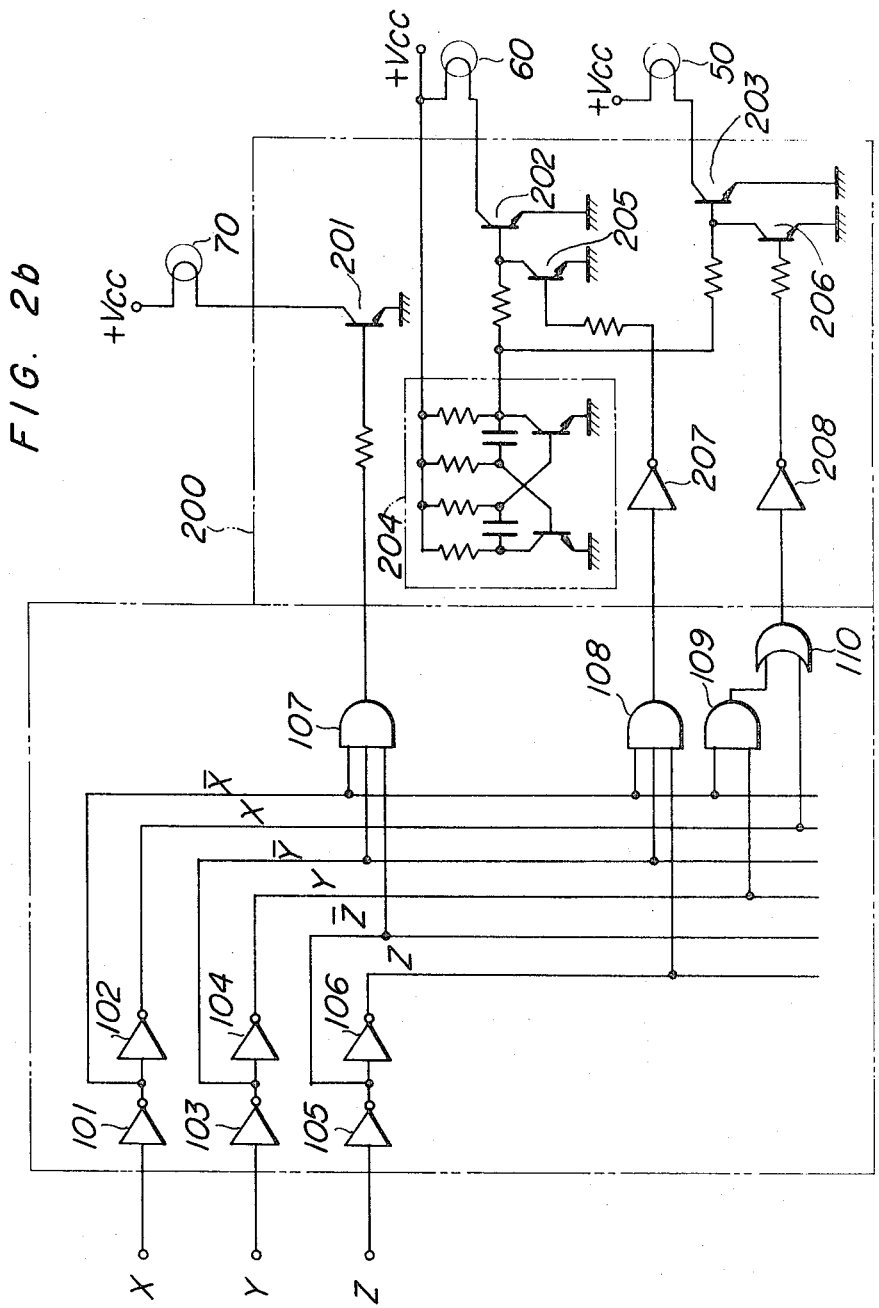

CENTRALIZED WARNING SYSTEM FOR VEHICLES

The present invention relates generally to a centralized warning system for vehicles and more particularly to a centralized warning system of the type which is capable of, prior to or during the traveling of a vehicle, checking and collectively indicating at one place whether those component parts, functions and the like of the vehicle which contribute to the safe driving thereof are in normal condition.

In the past, any attempt to always check, for the purpose of safe driving of a vehicle, whether a plurality of the vehicle parts having bearing on the driving of the vehicle would function normally so that the driver himself could always observe the results of the checking so as to know the absence or presence of abnormal condition while driving the vehicle has proved to be disadvantageous in that depending on the number of the component parts of a vehicle to be checked, such an attempt could burden the driver beyond his power of attention and thus could rather prevent the driver from concentrating his whole mind upon the driving of the vehicle.

Therefore, it is the main object of the present invention to provide a centralized warning system for vehicles comprising a plurality of sensors for generating signals indicative of the absence and presence of abnormality at a plurality of spots of a vehicle where checking is required, a signal stratification circuit for receiving the signals produced by said plurality of sensors representing the presence of abnormality at the checking spots to stratify said abnormality signals into at least two classes predetermined according to the conditions of danger against the driving of the vehicle and to select and generate the signal of higher degree danger, a warning device for receiving the output signals from said signal stratification circuit to provide warnings corresponding to said conditions of danger, a priority discriminating circuit for determining priority according to said conditions of danger between a plurality of said abnormality signals simultaneously generated from said plurality of sensors, an indicating device for receiving the signals produced from said priority discriminating circuit in accordance with said priorities to display the locations of abnormality through visually sensuous means in the form of letters, figures or the like, and a comparison circuit for comparing the content of display by said indicating device with the output from said priority discriminating circuit to maintain the operation of said indicating device until an agreement is found between said content and said output.

According to the present invention, the following effects are obtained:

The system according to the present invention comprises a plurality of sensors for producing, for example, "1" and "0" signals representing the absence and presence of abnormality at those spots of a vehicle requiring checking, a signal stratification circuit for receiving the signals produced by said plurality of sensors representing the presence of abnormality at the checking spots to stratify said abnormality signals into at least two classes predetermined according to the conditions of danger against the driving of the vehicle and to select and generate the signal of higher degree danger, and a warning device for receiving the output signals from said signal stratification circuit to provide warnings corresponding to said conditions of danger, and thus there is no need for the driver to personally keep watch as hitherto been required over every one of the required checking spots of a vehicle and at the same time the driver can notice the occurrence of abnormality at any of the required checking spots from the warnings provided by the warning device and still furthermore the driver can discern the condition of danger due to the abnormality by the kind of the warnings.

The signal stratification circuit described above comprises a first logic circuit for receiving signals from the plurality of sensors to give an indication when all of the checking spots are in a normal condition, and a second logic circuit for dividing the signals representing the presence of abnormality into higher significance signals and lower significance signals, and the warning device comprises a first warning lamp adapted to be lit upon receipt of the output signal from the first logic circuit and second and third warning lamps adapted to be lit upon receipt of the higher significance signal and the lower significance signal, respectively, from the second logic circuit, whereby the driver can positively notice from the operating conditions of the three warning lamps whether all of the fault checking spots are in normal condition or whether there is abnormality in any of such spots. Moreover, if there is any abnormality, the driver can also know whether the abnormality is of a highly dangerous nature, such as the insufficient amount of brake oil which may directly lead to an accident or it is of a less dangerous nature, such as a reduced state of gasoline under a minimum safe amount.

The system of the present invention further comprises priority discriminating circuit for determining priority according to the conditions of danger between a plurality of abnormality signals generated from the plurality of sensors, an indicating device for receiving the signals generated from the priority discriminating circuit according to said priorities to display the locations of abnormality through visually sensed means in the form of letters, figures or the like, and a coincidence circuit for comparing the content of display by the indicating device with the output from the priority discriminating circuit to maintain the operation of the indicating device until an agreement is found between said content and said output, whereby when the presence of abnormality is detected at two or more of the checking spots, the abnormal spots can be indicated by means of letters in order of their condition of danger against the driving of a vehicle so that the driver can notice them. In addition, the warning device and the indicating device are collectively arranged at the most conspicuous place for the driver and thus there is a remarkable effect in that there is no need for the driver to keep watch over those portions of a vehicle requiring checking to see whether there is any abnormality therein, and moreover if colored lamps are employed for the warning lamps of the warning device and if the driver only remember the meaning of the color assigned to each of the warning lamps, the driver can collectively confirm at one place the presence of normalcy as well as the presence of abnormality and its condition of danger and at the same time the driver can confirm the location of the abnormality from the display of the indicating device. Thus, the driver will never be prevented from concentrating his attention on the driving thereby greatly aiding the safe driving of the vehicle.

The priority discriminating circuit comprises an oscillator circuit for continually generating 1 and 0 signals of a given period, a counter circuit for counting the output of said oscillator circuit by a scaling factor of $2^n$, a multiplexer circuit for associating the output from the counter circuit with the output signals from the plurality of sensors according to the orders of priority, a flip-flop circuit which is to be set by the output from the multiplexer circuit, and a latch circuit for storing the output from the flip-flop, whereby when two or more signals each representing the presence of abnormality are simultaneously produced from the plurality of sensors, the order of priority between these signals can be determined through a relatively simple procedure according to the condition of danger of the abnormal conditions and at the same time only that signal which has the highest degree of danger is passed to the succeeding stage to thereby cause the indicating device to provide an indication of the abnormality by means of letters. Moreover, even if any signal having a lower degree of danger is generated from the different sensor during the succeeding cycle, this lower degree danger signal is not received by the latch circuit by virtue of its memory action if the latch circuit has already stored a signal having a higher degree of danger during the preceeding cycle and thus the latch circuit retains only the previously stored higher degree danger signal. In this way, the indicating device can always display by letters a higher degree danger signal in preference to a lower degree danger signal.

The comparison circuit comprises a circuit which receives as its inputs the output from the latch circuit and the signal corresponding to the content of display by the indicating device to provide an indication of agreement or disagreement between the two inputs, and the indicating device comprises on indicating means for providing the presentation of received information through the medium of visually sensed means in the form of letters, figures or the like and a driving means for actuating the indicating means. Thus, when the comparison circuit compares its two inputs and supplies and indication of disagreement therebetween, that is, when the priority discriminating circuit provides a new command, the driving means is brought into action to actuate the indicating device to display the letters corresponding to the command so that when the command and the display correspond with each other, the servomotor is stopped operating thereby continuously indicating the location of that abnormality until a signal having a higher degree of danger arrives in the course of the next cycle of operation. Furthermore, an improved response characteristic is ensured by the provision of a feedback system and thus a perfect correspondence between the output signal from the priority discriminating circuit and the display by the indicating device can be ensured.

The indicating device comprises a indicating means consisting of a rotating member on which such letters as "BRAKE OIL," "DOOR HALF-OPENED" and "GASOLINE" or the equivalent figures are inscribed to display the required checking spots of a vehicle in the order corresponding to the orders of priority determined by the priority discriminating circuit, means for electrically detecting the position of the rotating member to supply one of the inputs to the comparison circuit, and means for receiving the output of the comparison circuit to actuate the rotating member, whereby it is possible to indicate the locations of detected abnormalities and the normalcy of a vehicle through a simple means, such as the afore-mentioned lettered drum or a tape and at the same time the manufacturing cost can be reduced.

The above and other advantages will be readily apparent from the following description of a preferred embodiment of the invention taken in conjunction with the accompanying drawings, in which:

FIGS. 2a and 2b are electrical wiring diagrams each thereof showing a signal stratification circuit, warning indication circuit and warning lamps;

Figure 1:
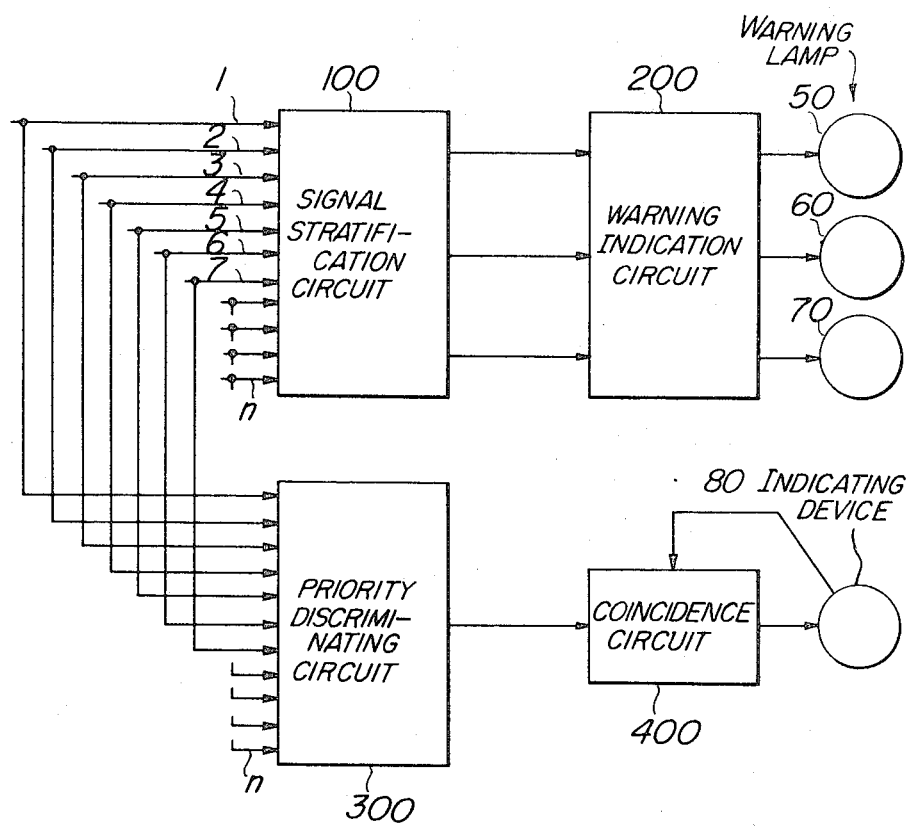
FIG. 1 is a block diagram showing the general construction of the system according to the preferred embodiment.

The present invention will now be explained with reference to the illustrated embodiment. The general construction of the system of the present invention and its operation will be discussed first with reference to the block diagram of FIG. 1. In the figure, numerals 1, 2, 3, 4, –, $n$ designate signals from a plurality of sensors mounted at a plurality of spots of a vehicle where checking is required, each thereof being an input which takes the form of a 0 signal (low potential electrical signal) when the checking spot is in normal condition and a 1 signal (high potential electrical signal) when there is abnormality in the checking spot; for example, a 0 signal will be produced if the engine oil pressure has a normal value, while a 1 signal will be produced if the quantity of brake oil is short of the prescribed amount. Numeral 100 designates a signal stratification circuit designed such that when the input signals 1, 2, 3, 4, –, $n$ include two or more 1 signals, these 1 signals are stratified into at least two strata of "WARNING" and "DANGER" by comparing the information contained therein, the stratum "WARNING" indicating that the abnormality is of a less dangerous nature and "DANGER" indicating an abnormality of a highly dangerous nature. For example, if a 1 signal representing the insufficient amount of brake oil and another 1 signal representing the slipped cooling fan belt for the vehicle engine are simultaneously generated, the former will be determined to be highly dangerous since the former condition has a great possibility of considerably reducing the braking effectiveness which may directly lead to an accident and thus has a higher value of information, whereas the latter will be determined to be less dangerous since the latter condition tends to cause the vehicle engine to overheat but has a much lower possibility of directly leading to an accident. Numeral 200 designates a warning indication circuit for lighting, for example, warning lamps 50, 60 and 70 in response to the stratified output signals from the signal stratification circuit 100, whereby when the output from the signal stratification circuit 100 is a DANGER signal representing a highly dangerous abnormality the warning lamp 50 which is red, for example, is lit, when the output is a WARNING signal which represents a less dangerous abnormality the warning lamp 60 which may comprise a yellow lamp is lit, and when the output is a signal representing the normal condition the warning lamp 70 which may be a green lamp is lit. Numeral 300 designates a priority discriminating circuit; 400 a coincidence circuit; 80 an indicating device; those parts of a vehicle where abnormality is detected being displayed in the form of letters by these circuits and the indicator in synchronism with the warning lamps 50, 60 and 70. The reason is that if the lighting of the red warning lamp 50 does not clearly indicate which of a number of highly critical parts exhibits abnormality, the driver will find it difficult to locate the place of abnormality and perform the required repair. Thus, in order to eliminate this deficiency, the abnormal parts are preferentially indicated in the form of letters in the order of their conditions of danger. The priority discriminating circuit 300 is designed such that when its input signals 1, 2, 3, 4, –, n include two or more 1 signals, a command is supplied to the indicating device 80 to display that part which has a higher degree of potential danger in preference to other parts. For example, while a 1 signal representing the lack of brake oil and another 1 signal representing the half-opened door are all abnormality signals representing highly dangerous abnormal conditions, the former will be displayed in preference to the latter since the former condition tends to considerably reduce the braking effectiveness and thus has a large possibility of directly leading to an accident. The coincidence circuit 400 compares the content of the current display of the indicating device 80 which is stored therein with the content of a newly received command from the priority discriminating circuit 300, so that when there is disagreement between the two contents the indicating device 80 is instructed to display the content of the newly received command.

The operation of the warning lamps 50, 60 and 70 and of the indicating device 80 may be summarized as follows: Assume that with the input signals 1, 2, 3, 4, –, n, information is received from each of the sensors adapted to represent with 1 and 0 signals (i) the presence and absence of the lack of brake oil, (ii) the presence and absence of the half-opened door, (iii) the existence and non-existence of the slipping-off of the fan belt, and (iv) the existence and non-existence of the gasoline remaining in excess of the prescribed amount. Then, if the above (i) and (ii) represent highly critical parts and (iii) and (iv) represent less critical parts and only the signal of (iv) assumes the 1 (abnormal) state, the yellow warning lamp 60 corresponding to the WARNING condition is lit and at the same time the indicating device 80 displays the letters "GASOLINE" to give a warning to the driver. In this state, if the signal of (i) changes to 1 (abnormal), the yellow warning lamp 60 goes off and the red warning lamp 50 is lit and concurrently the indicating device 80 changes its display to the letters "BRAKE OIL" thereby giving a warning that abnormality has occurred in a more critical part than the previous (iv). When all of the sensors supply the information corresponding to the 0 (normal) state, the green warning lamp 70 is lit and the indicating device 80 also displays such letters as "OK" or "GO" which means there is no danger for the driving of a vehicle. The warning lamps 50, 60 and 70 as well as the indicating device 80 are arranged so that they are gathered together to a place in the driver's compartment which is most conspicuous to the driver. Thus, the driver is relieved of his trouble of keeping watch over those parts of a vehicle where checking is necessary, and if the driver only remember the conventions on the operating conditions of the warning lamps 50, 60 and 70 and on the colors assigned thereto, the driver can notice, by reading the letters displayed by the indicating device 80, whether there is any abnormality in the required checking spots and, if there is any abnormality, its location and the degree of danger involved therein.

Figure 2A:
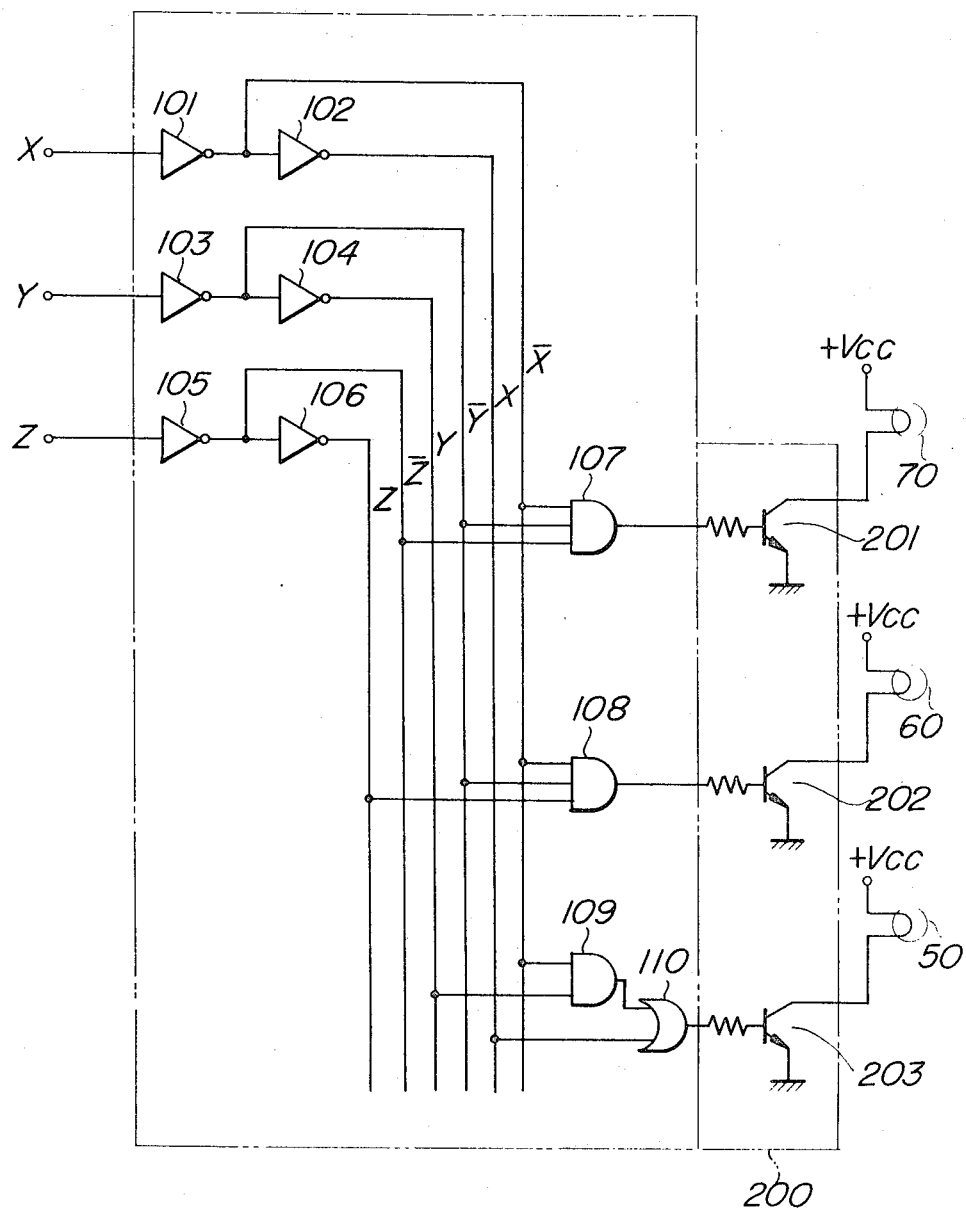

Next, the detailed construction and operation of each of the aforementioned circuits will be explained. For purposes of the following discussion, assume that the required checking spots are three and the corresponding input signals are X, Y and Z. Referring first to FIG. 2a illustrating in detail the signal stratification circuit 100, warning indicating circuit 200, and the warning lamps 50, 60 and 70 constituting the warning device, letters X, Y and Z designate the signals from the required checking spots. It is also assumed that the logical propositions are employed such that when all the spots are in normal condition then $X = 0$, $Y = 0$ and $Z = 0$, whereas when all the spots are in abnormal condition then $X = 1$, $Y = 1$ and $Z = 1$ and that the input signals $X$ and $Y$ are read from the sensors at the highly critical spots and the input signal $Z$ is read from the sensor at the less critical spot. As shown in Table 1, there are eight different kinds of combination of the three input signals $X$, $Y$ and $Z$. Numerals 50, 60 and 70 in the upper row of the right column of Table 1 designate signals for lighting the warning lamps 50, 60 and 70 for purposes of explanation.

TABLE 1

| X | Y | Z | 70 | 60 | 50 |
|---|---|---|----|----|----|
| "0" | "0" | "0" | "1" | "0" | "0" |
| "0" | "0" | "1" | "0" | "1" | "0" |
| "0" | "1" | "0" | "0" | "0" | "1" |
| "0" | "1" | "1" | "0" | "0" | "1" |
| "1" | "0" | "0" | "0" | "0" | "1" |
| "1" | "0" | "1" | "0" | "0" | "1" |
| "1" | "1" | "0" | "0" | "0" | "1" |
| "1" | "1" | "1" | "0" | "0" | "1" |

From Table 1 above, there are obtained equations $70 = \bar{X}\bar{Y}\bar{Z}$, $60 = \bar{X}\bar{Y}Z$ and $50 = \bar{X}Y + X$ or $\bar{X}Y + Y$. Referring again to FIG. 2a, numerals 101, 102, 103, 104, 105 and 106 designate inverter circuits; 107, 108 and 109, AND circuits; 110, an OR circuit; 201, 202 and 203, transistors for turning the warning lamps 70, 60 and 50 on and off. The output of the inverter circuit 101 is connected to the inputs of the AND circuits 107, 108 and 109, the output of the inverter circuit 102 is connected to the input of the OR circuit 110, the output of the inverter circuit 103 to the inputs of the AND circuits 107 and 108, the output of the inverter circuit 104 to the input of the AND circuit 109, the output of the inverter circuit 105 to the input of the AND circuit 107, and the output of the inverter circuit 106 to the input of the AND circuit 108. The output of the AND circuit 107 is connected to the base of the transistor 201, the output of the AND circuit 108 is connected to the base of the transistor 202, and the output of the AND circuit 109 is connected to the input of the OR circuit 110 whose output is in turn connected to the base of the transistor 203. With the arrangement described, the logical propositions as shown in Table 1 above are satisfied. In other words, when all the required checking spots are in normal condition, there is obtained a condition $X = 0$, $Y = 0$ and $Z = 0$ and only the output of the AND circuit 107 assumes the 1 state so that the transistor 201 is rendered conductive causing the green warning lamp 70 to go on. On the other hand, when abnormality occurs only in less critical parts thus producing $Z = 1$, $X = 0$ and $Y = 0$, only the output of the AND circuit 108 assumes the 1 state rendering the transistor 202 conductive and thus causing the yellow warning lamp 60 representing WARNING condition to go on. When $Z = 1$, if $X = 1$ or $Y = 1$, e.g., if there is a condition $X = 1$, $Y = 0$ and $Z = 1$, then only the output of the OR circuit 110 assumes the 1 state so that the transistor 203 is rendered conductive causing the red warning lamp 50 representing the DANGER condition to light and give a warning to the driver.

When abnormality occurs in the required checking spots, both the red warning lamp 50 representing the DANGER condition and the yellow warning lamp 60 representing the WARNING can be advantageously caused to flash in a given cycle so as to draw the driver's attention more effectively. An embodiment which is especially designed for this purpose will be explained with reference to FIG. 2b in which the identical reference numerals as used in FIG. 2a designate the identical parts or the equivalents thereof. In FIG. 2b, numeral 204 designates an oscillator comprising a free-running multivibrator which continually produces 1 and 0 signals at a predetermined period and the output of the oscillator is supplied to the base of each of the transistors 202 and 203 through a resistor. The bases of the transistors 202 and 203 are connected to the collectors of transistors 205 and 206, so that when the transistors 205 and 206 are conducting, the potential between the base and emitter of each of the transistors 202 and 203 becomes low thereby rendering the transistors 202 and 203 non-conductive irrespective of the output from the oscillator 204. The outputs of the AND circuit 108 and the OR circuit 110 which are inverted by the inverter circuits 207 and 208, respectively, are appled to the bases of the transistors 205 and 206. Thus, when the outputs of the AND circuit 108 and the OR circuit 110 are in the 0 state the warning lamps 50 and 60 remain in the off condition, whereas when either one of the outputs changes from 0 to 1 either the warning lamp 50 or 60 goes on and off intermittently at the oscillation period of the oscillator 204. In place of the warning lamps 50 and 60, the warning means may comprise acoustic means such as a buzzer. In this case, an improved effectiveness can be ensured, if the buzzer is used to sound a note of warning in slow cycles for the WARNING condition and in fast cycles for the DANGER condition.

Figure 3:
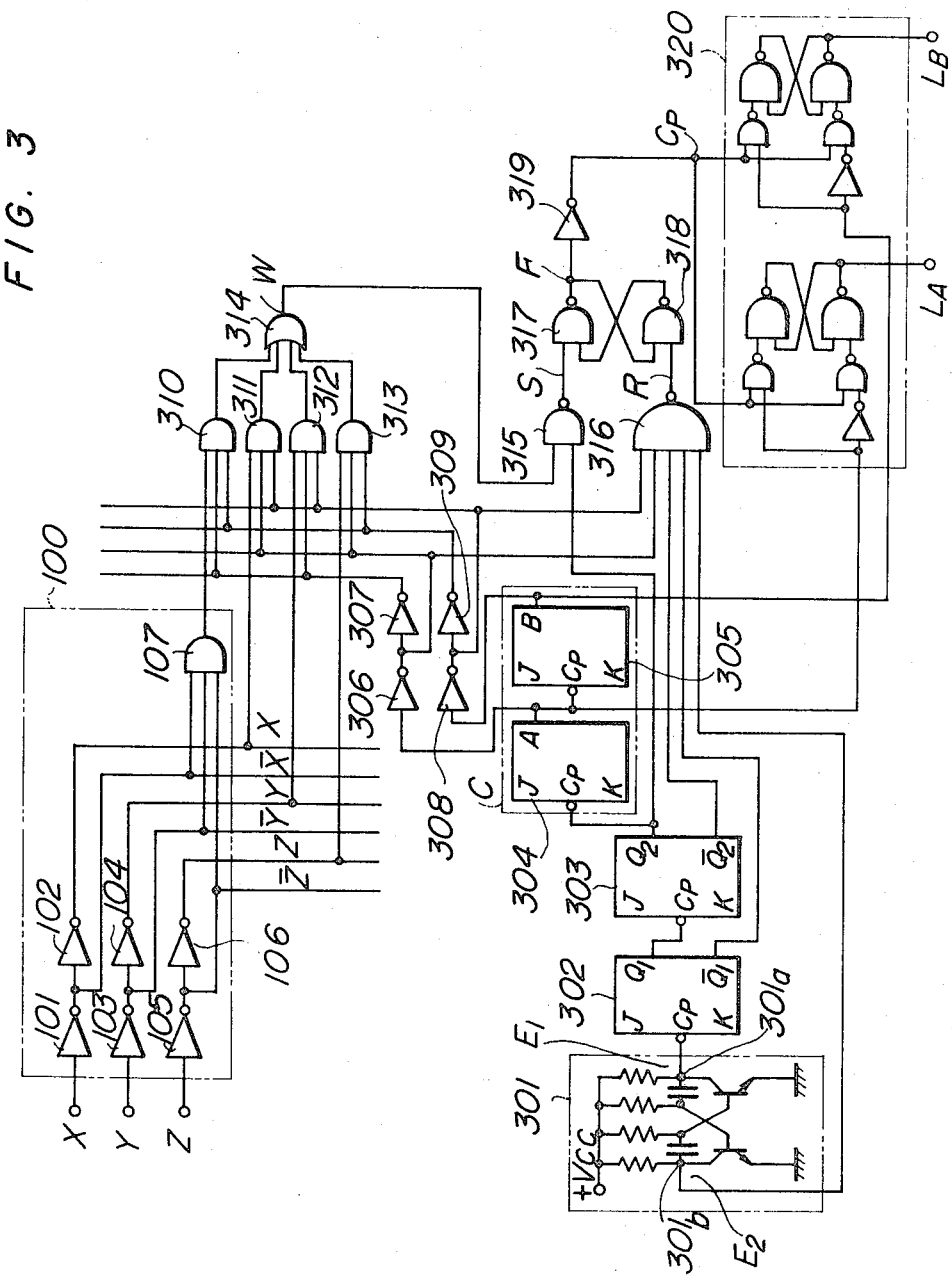
FIG. 3 is an electrical wiring diagram of a priority discriminating circuit.
Figure 4:
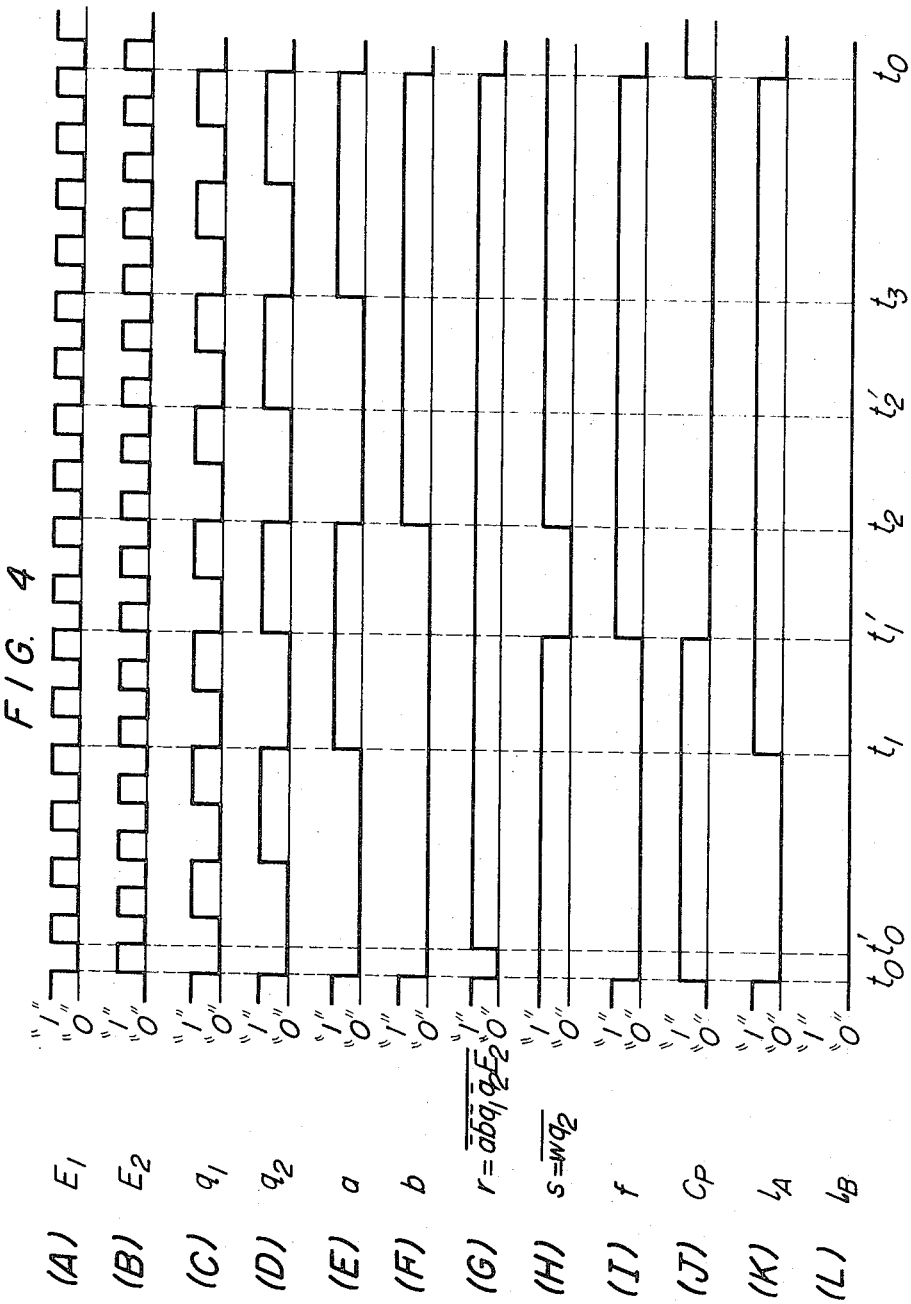
FIG. 4 illustrates waveforms of voltages at the various parts of the priority discriminating circuit of FIG. 3, which are useful for explaining the operation thereof.

Next, the construction and operation of the priority discriminating circuit 300 will be explained respectively with reference to FIG. 3 and FIG. 4 illustrating the waveform diagrams of the voltages at the various parts of the circuit. In FIG. 3, only the principal part of the signal stratification circuit 100 is shown. And the identical reference numerals as used in FIGS. 2a and 2b designate the identical parts and the input signals $X$, $Y$ and $Z$ are of the same nature as explained in connection with FIGS. 2a and 2b. Thus, no detailed explanation will be repeated here. Numeral 301 designates a known free-running multivibrator comprising transistors, capacitors and resistors and adapted to produce square wave pulses having a given frequency which is determined by selecting the constants of the resistors and the capacitors. The voltage waveforms of output pulses $E_1$ and $E_2$ produced at output terminals 301a and 301b are opposite in phase as shown in FIGS. 4A and 4B. Numerals 302 and 303 designate JK flip-flop elements constituting a frequency dividing circuit in which the output pulse $E_1$ of the free-running multivibrator 301 is applied to a clock pulse terminal $C_P$ of the preceeding stage JK flip-flop element 302 and an output signal $q_1$ produced at an output terminal $Q_1$ of the JK flip-flop element 302 is applied to a clock pulse terminal $C_P$ of the succeeding stage JK flip-flop element 303, whereby the frequency of the output pulse $E_1$ from the free-running multivibrator 301 is divided into one half and one fourth, respectively, and thus the pulse signal $q_1$ as shown in FIG. 4C is produced at the output terminal $Q_1$ of the JK flip-flop element 302 which is designed to perform 2 : 1 frequency division, and a pulse signal $q_1$ as shown in FIG. 4D is produced at an output terminal $Q_2$ of the JK flip-flop terminal 303 designed to perform 4 : 1 frequency division. Numerals 304 and 305 designate JK flip-flop elements constituting a two-bit counter circuit C in which the output pulse produced at the output terminal $Q_2$ of the JK flip-flop element 303 constituting the succeeding stage of the frequency dividing circuit is applied to a clock pulse terminal $C_P$ of the preceeding stage JK flip-flop element 304 so that an output pulse a shown in FIG. 4E appears at an output terminal A of the JK flip-flop element 304 and an output pulse $b$ shown in FIG. 4F appears at an output terminal B of the JK flip-flop element 305. Numerals 306, 307, 308 and 309 designate inverter circuits; 310, 311, 312 and 313, AND circuits; 314 an OR circuit. The AND circuit 310 produces the logic product of the output from the AND circuit 107 and the outputs from the inverter circuits 307 and 309, the AND circuit 311 produces the logic product of the outputs from the inverter circuits 102, 306 and 308, the AND circuit 312 produces the logic product of the outputs from the inverter circuits 104, 307 and 308, and the AND circuit 313 produces the logic product of the outputs from the inverter circuits 106, 306 and 309. The outputs of the AND circuits 310, 311, 312 and 313 are connected to the inputs of the OR circuit 314. Thus, if the condition $X = 1$ exists when the output pulses $a$ and $b$ from the JK flip-flop elements 304 and 305 of the counter circuit C are both 0, then the output $w$ of the OR circuit 314 is 1. Similarly, if $Y = 1$ when $a = 1$ and $b = 0$, when $w = 1$; if $Z = 1$ when $a = 0$ and $b = 1$, then $w = 1$; and if $X = Y = Z = 0$ (all the checked spots are in normal condition) when $a = 1$ and $b = 1$, then $w = 1$. The output pulses $(a, b)$ from the JK flip-flop elements 304 and 305 constituting the counter circuit C are repeatedly produced in the sequence of $a = 0$, $b = 0$; 1, 0; 0, 1; 1, 1; 0, 0; . . . by the output pulse from the free-running multivibrator 301 and so the sequence of the signals from the required checking spots can be predetermined to correspond to these signals $a$ and $b$ thereby assigning priority between the signals. A multiplexer circuit is formed by the inverter circuits 306, 307, 308 and 309, the AND circuits 310, 311, 312 and 313 and the OR circuit 314. Numerals 317 and 318 designate NAND circuits constituting a set-reset flip-flop in which its set input terminal S receives an output signal S (FIG. 4H) from a NAND circuit 315 for producing the "nand" of the output signal w from the OR circuit 314 in the multiplexer circuit and the output signal $q_2$ from the JK flip-flop element 303 of the frequency dividing circuit and its reset input terminal R receives an output signal r (FIG. 4G) from a NAND circuit 316 for producing the nand of output signals $\bar{a}$ and $\bar{b}$ from the inverter circuits 306 and 308, output signals $\bar{q_1}$ and $\bar{q_2}$ from the JK flip-flop elements 302 and 303 of the frequency dividing circuit and the output signal $E_2$ from the free-running multivibrator 301. An output signal $f$ as shown in FIG. 4I is produced at an output terminal F of the SR flip-flop and it is then inverted by the inverter circuit 319 into a clock pulse $C_p$ as shown in FIG. 4J which is in turn applied to a clock pulse terminal $C_p$ of a latch circuit 320. The latch circuit 320 conventionally comprises flip-flops provided with gate circuits on the inputs thereof so that when the clock pulse $C_p$ is 1 the input signal levels are permitted to directly appear at its output terminals LA and LB and the levels of the input signals at the time that the clock pulse $C_p$ changes from 1 to 0 are maintained at the output terminals LA and LB. For example, consider the case where the output signals from the JK flip-flop elements 304 and 305 constituting the counter circuit C are $a = 0$ and $b = 1$ when the clock pulse $C_p$ is 1. Then, if the output signals still maintain the same condition $a = 0$ and $b = 1$ at the moment that the clock pulse $C_p$ changes from 1 to 0, similar signals $1_a = 0$ and $1_b = 1$ will be produced and maintained at the output terminals LA and LB. The waveforms of the output signals $1_a$ and $1_b$ produced at the output terminals LA and LB are as shown in FIGS. 4K and 4L. In FIGS. 4A through 4L, the abscissae represent the time $t$ which is identical throughout the figures and the ordinates represent the voltate levels 1 and 0.

The priority discriminating circuit 300 constructed as described above operates as follows. The output pulse $E_1$ of the free-running multivibrator 301 is applied to the clock pulse terminal $C_p$ of the JK flip-flop element 302 constituting the frequency dividing circuit so that the output pulse $q_1$ shown in FIG. 4C and having a frequency which is one half of that of the output pulse $E_1$ is produced at the output terminal $Q_1$ of the JK flip-flop element 302. The output pulse $q_2$ shown in FIG. 4D and having a frequency which is one fourth of that of the output pulse $E_1$ is produced at the output terminal $Q_2$ of the JK flip-flop element 303. On the other hand, the pulse signals (not shown) obtained by inverting the phase of the output pulses $q_1$ and $q_2$ are generated at the other output terminals $\bar{Q_1}$ and $\bar{Q_2}$ of the JK flop-flop elements 302 and 303, respectively. At the output terminals A and B for the respective bits of the JK flop-flop elements 304 and 305 constituting the counter circuit C, there are produced signals whose frequencies are respectively one half and one fourth of that of the output signal $q_2$ generated from the JK flip-flop element 303, so that the following combinations of the output signals appear: During a time period $t_0 \sim t_1$, $a = 0$, $b = 0$; $t_1 + t_2$, $a = 1$, $b = 0$; $t_2 \sim t_3$, $a = 0$, $b = 1$; and $t_3 \sim t_0$, $a = 1$, $b = 1$. These combinations of the output signals appear repeatedly in this sequence. Thus, by correspondingly associating the conditions $X = 1$, $Y = 1$, $Z = 1$ and $X = Y = Z = 0$ with the aforementioned four combinations of the signals $a$ and $b$, i.e., 0, 0; 1, 0; 0, 1; and 1, 1, the OR circuit 314 in the multiplexer circuit produces $w = 1$ respectively during a time period $t_0 \sim t_1$ when there is the condition $X = 1$, during $t_1 \sim t_2$ when there is $Y = 1$, during $t_2 + t_3$ when this is $Z = 1$, and during $t_3 \sim t_0$ when there is $X = Y = Z = 0$.

On the other hand, the set-reset flip-flop comprising the NAND circuits 317 and 318 receives at its reset input terminal R the output signal $r = a\ b\ q_1\ q_2\ E_2$ from the NAND circuit 316, so that a 0 signal is infallibly applied to the reset input terminal R during a time period $t_0 \sim t_0'$ for every one period of the output signal b from the counter circuit C. This produces a 0 signal at the output terminal F of the set-reset flip-flop and this 0 signal is inverted by the inverter circuit 319 so that the inverted 1 signal is applied to the clock pulse terminal $C_p$ of the latch circuit 320 thereby causing it to store at its output terminals LA and LB the output signals a and b of the counter circuit C applied thereto at that time. On the other hand, the set-reset flip-flop receives at its set input terminal S the output signal $s = \overline{wq_2}$ from the NAND circuit 315 so that if there appears the combination $a = 1$, $b = 0$ when $Y = 1$, for example, the output signal w of the OR circuit 314 assumes the 1 state so that as shown in FIG. 4H the output signal $s$ of the NAND circuit 315 assumes the 0 state only during a time period $t_1' \sim t_2$ and that the set input terminal S receives a 0 signal only during the same period $t_1' \sim t_2$ thus producing a 1 signal at the output terminal F. When this happens, the clock pulse $C_p$ to the latch circuit 320 changes from 1 to 0 so that the output signals $a = 1$, $b = 0$ applied from the counter circuit C at that time are stored at the output terminals LA and LB of the latch circuit 320. In other words, the occurrence of abnormality at the vehicle part associated with the sensor for generating the signal Y is stored at the output terminals LA and LB of the latch circuit 320 in the form of the signal combination 1 and 0. In the event that $Z = 1$, the similar operation continues to take place so that during a time period $t_2' \sim t_3$ the signal at the set input terminal S of the set-reset flip-flop changes to 0, but this 0 signal is not received since it is considered as an inhibition due to the characteristic of the set-reset flip-flop. Thus, the clock pulse $C_p$ to the latch circuit 320 remains in the 0 state and hence the previously stored 1 and 0 signals are continuously held at the output terminals LA and LB of the latch circuit 320. With the commencement of the second period, the signal at the reset input terminal R of the set-reset flip-flop assumes the 0 state during the time period $t_0 \sim t_0'$ so that the latch circuit 320 temporarily loses its stored content which is restored at the time $t_1'$. It is to be noted here that this temporary loss of the information may be rendered insignificant in practical application by selecting the repetition period of the output signals a and b from the counter circuit C to be sufficiently short as compared with the delay time attended by the starting of the servomotor in the indicating device 80 which will be explained later.

Figure 5:
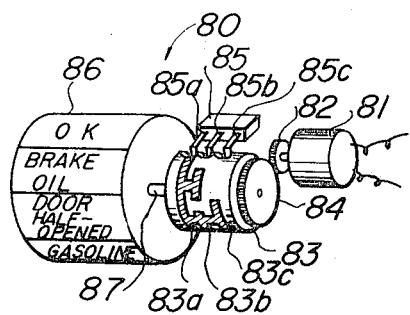
FIG. 5 is a perspective view showing the construction of an indicating device.
Figure 6:
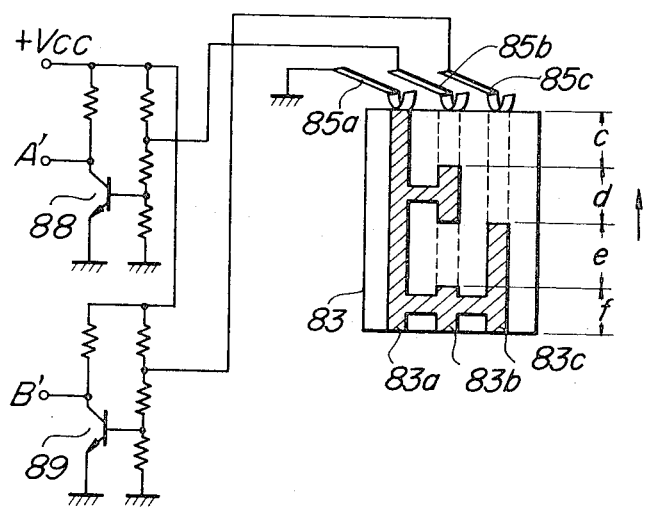
FIG. 6 is an electrical wiring diagram associated with the indicating device of FIG. 5.

Next, the construction and operation of the indicating device 80 will be explained with reference to FIGS. 5 and 6. Referring first to FIG. 5, numeral 81 designates a servomotor such as a DC motor; 82 a toothed wheel directly mounted on the shaft of the servomotor 81; 86 a lettered drum having a slip ring 83 and a toothed wheel 84 directly mounted on its shaft 87 with the toothed wheel 84 being in mesh with the toothed wheel 82 to transmit the rotation of the servomotor 81 to both the slip ring 83 and the lettered drum 86 at reduced speed through the toothed wheels 82 and 84. The base plate of the slip ring 83 consists of an insulating material and conducting strips 83a, 83b and 83c are placed on the outer periphery of the slip ring 83. FIG. 6 illustrates a development of the slip ring 83 and it will be seen that the conducting strip 83a extends over the whole ring circumference, the conducting strip 83b extends on every one fourth of the circumference and the conducting strip 83c extends over one half of the circumference. The relative positions of these conducting strips are as shown in FIG. 6. Numeral 85 designates a brush holder carrying three brushes 85a, 85b and 85c which are adapted to slidably ride on the conducting strips 83a, 83b and 83c, respectively. The brush 85a is also connected to ground, the brush 85b to the base of a transistor 88 and the brush 85c to the base of a transistor 89. With the construction described, when the slip ring 83 rotates in the direction indicated by an arrow in FIG. 6, if the brushes 85a, 85b and 85c are in an area c, the transistors 88 and 89 will be rendered conductive so that the potentials at their respective collectors A' and B' are at the ground potential (0). As the slip ring 83 rotates further so that the brushes 85a, 85b and 85c enter into an area d, the transistor 89 remains in its conductive state still maintaining the 0 potential at its collector B', but the transistor 88 is cut off since its base is now connected to ground. This causes the potential at the collector A' of the transistor 88 to rise up to the power supply voltage +$V_{cc}$ (1). Further consideration in a similar manner indicates that there are relationships among the positions of the brushes 85a, 85b and 85c and the signals at the collectors A' and B' of the transistors 88 and 89 as shown in the following table 2:

TABLE 2

| Brush position | Collector A' of transistor 88 | Collector B' of transistor 89 |
|---|---|---|
| c | 0 | 0 |
| d | 1 | 0 |
| e | 0 | 1 |
| f | 1 | 1 |

The outer periphery of the lettered drum 86 is divided into four equal sections so that the designations of the required checking spots can be inscribed on those sections which occupy the relative positions corresponding to the areas c, d, e and f on which the brushes 85a, 85b and 85c slide. For example, the designation BRAKE OIL may be inscribed on the position corresponding to the area c, DOOR HALF-OPENED on the position corresponding to the area d, GASOLINE on the position corresponding to the area e, and OK (all the checked parts are in normal condition) on the position corresponding to the area f. In this case, the order of the checking spots to be inscribed in correspondence with the areas c, d, e and f must correspond with the areas c, d, e and f in this order as is the case with the previously explained orders of priority determined in the priority discriminating circuit 300.

It is apparent that while the embodiment shown in FIGS. 5 and 6 has been explained as employing two pairs of the conducting strips 83b and 83c and the brushes 85b and 85c, three pairs or four pairs of them may be employed to provide eight or 16 different kinds of signals.

Figure 7:
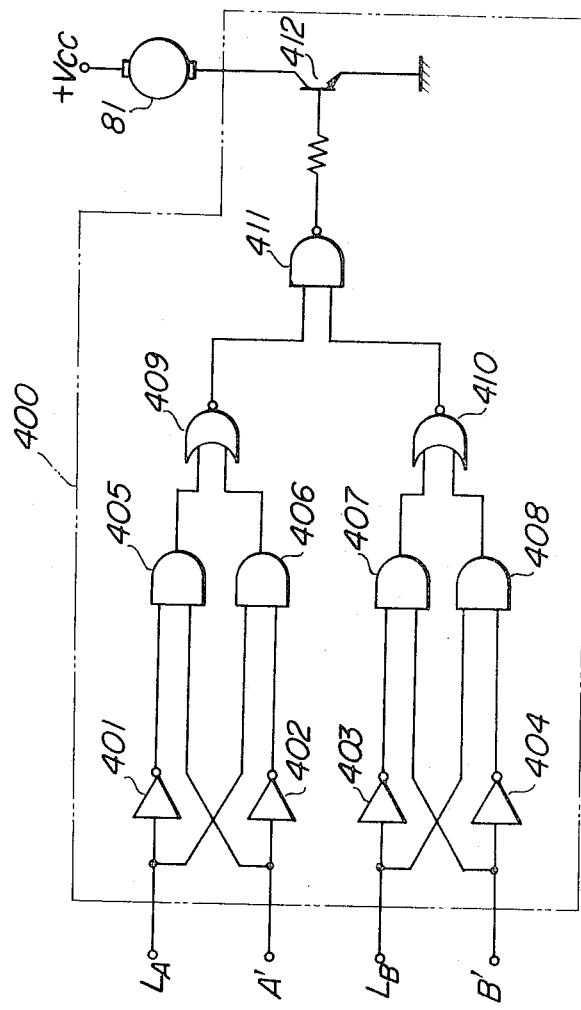
FIG. 7 is an electrical wiring diagram of a coincidence circuit.

Next, the construction and operation of the coincidence circuit 400 will be explained in detail with reference to FIG. 7. In the figure, numerals 401, 402, 403 and 404 designate inverter circuits; 405, 406, 407 and 408, AND circuits; 409 and 410, NOR circuits; 411 a NAND circuit. With these circuits, two kinds of two-bit signal are compared in magnitude. In the figure, input terminals LA and LB are connected to the output terminals LA and LB of the latch circuit 320 shown in FIG. 3, and input terminals A' and B' are connected to the collectors A' and B' of the transistors 88 and 89 shown in FIG. 6. The output of the NAND circuit 411 is also connected to the base of a transistor 412. Numeral 81 designates a servomotor mentioned previously. With the construction described, the signal at the output of the NAND circuit 411 assumes the 0 state only when the signals applied to the input terminals LA and A' are equal to each other and the signals applied to the input terminals LB and B' are also equal to each other. Thus, so far as the relative positions between the conducting strips 83b and 83c on the slip ring 83 and the brushes 85b and 85c do not coincide with the values dependent upon the combinations of the signals produced at the output terminals LA and LB of the latch circuit 320, the NAND circuit 411 continues to produce a 1 signal so that the transistor 142 is rendered conductive to actuate the servomotor 81 whose actuation in turn causes the slip ring 83 to rotate. When the aforesaid relative positions coincide with the signals produced at the output terminals LA and LB of the latch circuit 320, the NAND circuit 411 produces a 0 signal thereby rendering the transistor 412 nonconductive and thus stopping the servomotor 81. In this way, the lettered drum 86 indicates the checking spot as determined by the priority discriminating circuit 300.

While a specific embodiment of the present invention has been explained, the present invention is not limited to the illustrated embodiment and it should be noted that many other forms of the embodiment should be readily apparent to those skilled in the art. For example, while a specific embodiment has been explained as involving three checking spots, such checking spots can be increased to any desired number using the same procedures as employed in the illustrated embodiment and hence the number of letters to be inscribed on the outer periphery of the lettered drum 86 can also be selected as desired. Furthermore, the free-running multivibrator 301 in the priority discriminating circuit 300 shown in FIG. 3 may also be used to concurrently perform the function of the oscillator 204 in the warning indication circuit 200 explained in connection with FIG. 2b. Moreover, the yellow warning lamp 60 may be caused to flash by the output signal $q_2$ from the flip-flop element 303 or the output signal b from the flip-flop element 305, and the red warning lamp 50 may also be caused to flash by the output signal $q_1$ from the flip-flop element 302 or the output signal a from the flip-flop element 304. In the event that abnormality occurs at a plurality of spots, the defective spots may be alternately indicated. As for the means for indicating defective spots, some other means may be employed in addition to the servomotor 81 used in the illustrated embodiment, such as one in which an endless tape carrying letters, figures or pictures thereon is advanced frame by frame by means of a ratchet mechanism operated by an electromagnet or a step-motor is employed. Moreover, in addition to the slip ring 83, means for detecting the position of the motor, lettered drum or tape may comprise a combination of a light source and a photosensitive element such as a photo transistor.

What we claim is:

1. A centralized warning system for vehicles comprising:
   a plurality of sensors for generating signals representative of the absence and presence of an abnormality at a plurality of selected locations of the vehicle to be checked,
   a signal stratification circuit for receiving the signals produced by said plurality of sensors representing the presence or absence of an abnormality at the selected checking locations to stratify said abnormality signals into at least two classes predetermined according to a selected categorization of the degree of danger of driving the vehicle under such an abnormal condition and to selectively generate the signal of higher degree danger when more than one abnormality exists,
   a warning device for receiving the output signals from said signal stratification circuit to provide warnings corresponding to said degrees of danger,
   a priority discriminating circuit responsive to said abnormality signals for determining priority according to said degrees of danger between any plurality of said abnormality signals simultaneously generated from said plurality of sensors,
   an indicating device for receiving the signals produced from said priority discriminating circuit according to said priorities to display the locations of abnormality including visually sensed means, and
   a coincidence circuit for detecting the content of display of said indicating device and the output from said priority discriminating circuit for maintaining the operation of said indicating device until a coincidence is detected between said content and said output.

2. A centralized warning system for vehicles according to claim 1, wherein said signal stratification circuit comprises:
   a first logic circuit for receiving the signals from said plurality of sensors for providing an indication of total absence of abnormalities and
   a second logic circuit for dividing the signals representative of abnormal conditions into higher significance signals and lower significance signals,
   said warning device includes:
   a first warning lamp adapted to be lit upon receipt of the output signal from said first logic circuit and at least two warning lamps each adapted to be lit respectively upon receipt of said higher significance signal and said lower significance signal from said second logic circuit.

3. A centralized warning system for vehicles according to claim 1, whrein said priority discriminating circuit comprises:
   an oscillator circuit for continually producing signals having a predetermined period, a counter circuit connected to said oscillator for counting the output of said oscillator circuit by a scaling factor of $2^n$, a multiplexer circuit for associating the output of said counter circuit with the output signals from said plurality of sensors according to the orders of priority, said multiplexer circuit being connected to said counter circuit and said plurality of sensors, a flip-flop adapted to be set by the output from said multiplexer circuit, and a latch circuit connected to said counter circuit and said flip-flop for receiving the output of said flip-flop as a clock pulse input to store the output of said counter circuit.

4. A centralized warning system for vehicles according to claim 3, wherein said coincidence circuit comprises:
   a circuit for receiving as its inputs the output of said latch circuit and the signal corresponding to the content of display by said indicating device for providing indications of agreement or disagreement between said two inputs, and
   said indicating device includes:
   indicating means for displaying through said visually sensed means in the form of letters, figures or the like and
   driving means for actuating said indicating means, said driving means being actuated only while said coincidence circuit maintains an indication of disagreement between said two inputs.

5. A centralized warning system for vehicles according to claim 1, where said indicating device comprises:
   a member rotatably mounted therein having inscribed thereon letters, figures or the like representing each of the selected checking spots of the vehicle and arranged in the order corresponding to the orders of priority according to said priority discriminating circuit, means for electrically detecting the position of said rotating member to provide one of the inputs to said comparison circuit, and driving means for receiving the output of said coincidence circuit to drive said rotatable member.

6. A centralized warning system for vehicles comprising:
   first means including a plurality of sensors for generating signals representative of the absence or presence of an abnormality each at a selected location in the vehicle to be monitored;
   second means having an input responsive to each of said sensor signals for generating in accordance with a system of priority a selected output signal indicating the selected abnormal condition having the highest priority, or if none, the normal condition;
   means for providing a visual display indication of the normal condition and various types of abnormal conditions and providing a feedback signal uniquely corresponding to the instant condition displayed; and
   coincidence means response to said feedback signal of the indication means and the selected output signal of said second means for establishing the visual display of said indication means in one of said indications in response to coincidental occurrence of the output of the second means and the indication means being in agreement; whereby there is provided by said indication means an indication of the highest priority abnormal condition or if none the normal condition in accordance with said system of priority.

7. The centralized warning system of claim 6 including further means having inputs respectively responsive to said sensor signals for activating selected outputs indicative of a totally normal condition of all sensors and at least two other outputs respectively indicative of different degrees of abnormality, wherein said further means comprises a plurality of logic elements each responsive to a different selective signal combination derived from said sensor signals for activating the selected outputs in accordance with said priority system and including:

at least three light emitting indicating devices coupled to said logic elements for receiving said selected outputs, the first light device indicating a totally normal condition, the second indicating a relatively minor abnormality and a third indicating a major abnormality, said first device being lighted when all of the signals generated by said sensors are in a condition indicating normality, the second light emitting device being activated when at least one of said sensors is generating a signal indicative of a minor abnormality, and the third of said light emitting devices being activated when at least one of said sensors is producing a signal indicative of a major abnormality.

8. The centralized warning system as described in claim 6 wherein said second means comprises pulse generating means, a plurality of logic elements each responsive to said pulse generating means and said sensor signals for producing any one of a plurality of selected pulse outputs at different cyclic sampling times in accordance with said selected priority system and respectively indicative of the normal conditions and varying types of abnormal conditions, and output means connected to said logic elements for producing, in accordance with the selected one of said logic means pulse outputs, the said output signals in binary coded form for said coincidence means and indicative thereto of the normal condition and the varying types of abnormal conditions.

9. Apparatus in accordance with claim 6, wherein said second means includes an oscillator circuit for continually producing signals having a predetermined period, a counter circuit connected to said oscillator for counting the output of said oscillator circuit by a scaling factor of $2^n$, a multi-plexer circuit for associating the output of said counter circuit with the output signals from said plurality of sensors in accordance with said system of priority, said multiplexer circuit being connected to said counter circuit and said plurality of sensors, a flip-flop adapted to be set by the output from said multiplexer circuit, and a latch circuit connected to said counter circuit and said flip-flop for receiving the output of said flip-flop as a clock pulse input to store the output of said counter circuit, said latch circuit having at least two outputs for producing the series of pulses in accordance with the system of priority and the time sequence produced by said oscillator.

10. The apparatus as described in claim 6 wherein said indication means includes means for displaying through visually sensed means in the form of letters, figures, or the like and a driving means for actuating said indication means actuated in accordance with the output of said coincidence means only when the feedback signal thereof and the selected series of outputs of said second means are in disagreement.

11. The apparatus as described in claim 10 wherein said indication means comprises a member rotatably mounted in the vehicle having inscribed thereon said letters, figures, or the like representing each of the selected locations of the vehicle to be monitored and arranged in an order corresponding to the system of priority, and means for electrically detecting the position of said rotating member to produce the feedback signal as an input to said coincidence means such that when the series of selected outputs of said second means and the feedback output of the rotating member are the same, the rotation of said rotatably mounted device is terminated for indicating in accordance with said priority system the normal condition or the most dangerous condition presently occurring.

* * * * *